United States Patent [19]

Valt

[11] 4,054,061

[45] Oct. 18, 1977

[54] GRADUATED PIPETTE EQUIPPED WITH A LATERAL SUCTIONS SQUIRT

[76] Inventor: Alfredo Valt, Via Giambellino 41A, 20146 Milan, Italy

[21] Appl. No.: 658,944

[22] Filed: Feb. 17, 1976

[30] Foreign Application Priority Data

Jan. 14, 1976 Germany ............................ 7600897

[51] Int. Cl.2 ............................................... G01N 1/14

[52] U.S. Cl. .................................................... 73/425.6

[58] Field of Search ......................... 73/425.6, 425.4 P; 23/292

[56] References Cited

U.S. PATENT DOCUMENTS

| | | | |
|---|---|---|---|
| 553,044 | 1/1896 | Sharples | 73/425.4 P UX |
| 2,153,105 | 4/1939 | Szecsi | 73/425.6 |
| 2,410,552 | 11/1946 | Rosen | 73/425.6 |
| 3,039,500 | 6/1962 | Goldberg | 73/425.6 UX |

FOREIGN PATENT DOCUMENTS

| | | | |
|---|---|---|---|
| 651,374 | 3/1951 | United Kingdom | 73/425.4 P |

*Primary Examiner*—Jerry W. Myracle
*Assistant Examiner*—Joseph W. Roskos
*Attorney, Agent, or Firm*—William Anthony Drucker

[57] ABSTRACT

Graduated pipette formed by a stem having an inner diameter of suitable size, while said stem is closed at the top and its lower end presents a beveled edge. The stem is equipped at a suitable height, with a lateral branch formed by a capillary tube with a rubber cap or bulb fixed thereto having a suitable configuration and size such as to delimit a bigger volume than the volume of the stem. The cap presents an inner volume sufficient to move an air mass which, with drawn liquid is enough to fill all of the stem portion below the branch.

1 Claim, 1 Drawing Figure

GRADUATED PIPETTE EQUIPPED WITH A LATERAL SUCTIONS SQUIRT

Figure 1:
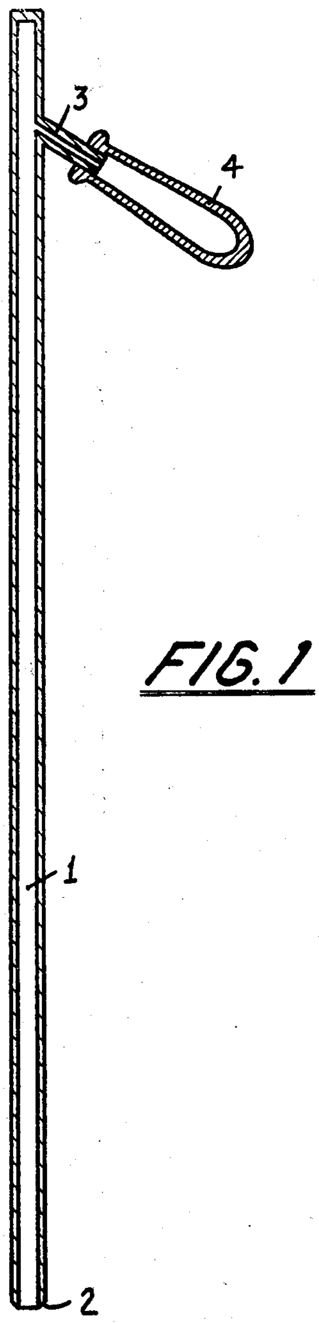

The subject of this invention is formed by a graduated pipette which is equipped with a lateral branch having a rubber cap which acts as suction squirt.

As everybody knows for the drawing and measurement of small quantities of liquid special instruments are used which are called pipettes. The latters are formed by a glass cane within which the liquid is taken in through a vacuum directly or indirictly produced by the mouth.

Such practice obviously presents various negative aspects, both from a functional and hygienic point of view. The suction by mouth involves first of all a lengthening of the drawing operations, since y the drawings shall result generally, approximately above or below, on the quantities necessary for the tests.

Moreover in the particular case in which blood tests must be carried out as, for example, the evaluation of its heritrosedimentation velocity, it may happen that with the usual pipettes the blood itself comes into contact with the operator's mouth.

Said inconveniences are eliminated through the use of the graduated pipette which forms the subject of this invention.

Said pipette is formed by a small cane having a suitable length and an inner diameter suitably small.

This cane is closed on one end whilst at the other end it has a beveled edge. Said cane is moreover equipped, in suitable position, whith a lateral branch extending downwardly, of short length, ending with a rubber cap or bulb suitably dimensioned.

More exactly said cap presents an inner volume sufficient to move an air mass which is enough to fill, with the liquid to be drawn, all the cane portion below said branch.

Particularly the subject pipette in one of its specific realizations for its use in the tests concerning the heritrosedimentation of blood, keeps the fundamental characteristic of Westhergreen method unaltered.

More exactly the pipette shall have, in this case, a stem with an inner diameter of 2,5 mm and with an useful length of 20 cm/.

Such stem or cane has subdivisions every 20 mm starting from the base.

In said particular realization the branch is made by a capillary tube, ending with a rubber or elastomer cap having a capacity of 1,5 cc approx.

The graduation of the stem may also be foreseen beginning from the top, that is with "O" placed in correspondence of the level of the lateral branch of the stem.

This and other characteristics, of functional and constructive nature, of the graduated pipette which forms the object of this invention, can be better understood with the aid of the attached drawing in which:

FIG. 1 said pipette is shown in side view.

With particular reference to the numeric symbols of said figure, the pipette is formed by a cane 1 having an inner diameter of suitable size.

Said cane is made preferably of hard plastic material and is closed at the top while at its lower end it has a beveled edge 2.

Said cane 1 is equipped, at a suitable height, with a lateral branch 3 formed by a short capillary tube.

At the end of the latter a rubber cap 4 is fixed, presenting a suitable configuration and sizes and, anyhow, having an inner volume bigger than the volume of the cane so that excess fluid is collected.

Moreover said cane 1 has a suitable graduation which may be marked, according to one's exigenciess, starting from the base or starting from the branch point of the capillary tube 3.

From what previously explained and from the observation of the attached drawing it is obvious the better functionality and use practicality which characterize the graduated pipette forming the object of this invention.

I claim:

1. A graduated pipette including an elongated tubular member closed at one end and open at the other, a laterally and downwardly extending capillary tube integrally connected with the tubular member adjacent its closed end but spaced therefrom and in communication with the interior thereof, and a bulb mounted on said capillary tube with its interior in communication with the passageway of the capillary tube, wherein the interior volume of the bulb is greater than that of tubular member in the bulb.

* * * * *